United States Patent [19]

Kornberg

[11] Patent Number: 5,243,460
[45] Date of Patent: Sep. 7, 1993

[54] LIGHT FILTERING SYSTEM FOR CREATING PERCEPTION OF STEREOSCOPIC IMAGES FROM TWO-DIMENSIONAL IMAGES AND ENHANCING PERCEPTION OF OBJECTS

[76] Inventor: Elliot Kornberg, Cape Royal Bldg. Suite 416, 1980 North Atlantic Ave., Cocoa Beach, Fla. 32931

[21] Appl. No.: 789,582

[22] Filed: Nov. 8, 1991

[51] Int. Cl.⁵ ............ G02B 27/22; G02C 7/04; G02C 7/10; H04N 13/00
[52] U.S. Cl. ............ 359/464; 351/162; 351/163; 358/88
[58] Field of Search .......... 359/464; 358/88, 89; 351/162, 163, 165

[56] References Cited

U.S. PATENT DOCUMENTS

| | | | |
|---|---|---|---|
| 1,182,280 | 5/1916 | Kennedy | 352/63 |
| 1,498,743 | 6/1924 | Macy | 352/63 |
| 1,548,262 | 8/1925 | Freedman | 351/165 |
| 1,745,107 | 1/1930 | Mendoza | 352/63 |
| 4,134,644 | 1/1979 | Marks et al. | 359/464 |
| 4,247,177 | 1/1981 | Marks et al. | 359/464 X |

FOREIGN PATENT DOCUMENTS

| | | | |
|---|---|---|---|
| 3343781 | 6/1985 | Fed. Rep. of Germany | 359/464 |
| 3428038 | 8/1985 | Fed. Rep. of Germany | 359/464 |

Primary Examiner—Scott J. Sugarman
Attorney, Agent, or Firm—Beveridge, DeGrandi, Weilacher & Young

[57] ABSTRACT

A light filtering system for creating perception of a stereoscopic image from a conventional video image is disclosed. The light filtering system has a first lens formed of a red filter and a second lens formed of a green filter. In a preferred embodiment, the red filter will filter light to the dominant eye while the green filter will filter light to the non-dominant eye. A method creating perception of a stereoscopic image by a viewer of a conventional video image also is disclosed.

17 Claims, 3 Drawing Sheets

RED LENSE

GREEN LENSE

LIGHT FILTERING SYSTEM FOR CREATING PERCEPTION OF STEREOSCOPIC IMAGES FROM TWO-DIMENSIONAL IMAGES AND ENHANCING PERCEPTION OF OBJECTS

BACKGROUND

1. The Field of the Invention

The present invention relates to a light filtering system for creating stereoscopic images or enhancing three-dimensional images. More particularly, the present invention relates to a method for imparting a stereoscopic quality to a two-dimensional color television image or like video image, or to enhance an existing three-dimensional image. In a further aspect, the present invention also relates to the eye wear which can be used in accordance with the system.

2. The Prior Art

The prior art includes systems developed to convert a two-dimensional movie or television image to a stereoscopic image. Most of the conventional systems involve a modified two-dimensional image. Generally, these systems require the projection of two separate, shifted images using light of two different colors or polarizations. Specialized eye wear then separates the images, transmitting one image to one eye and the other image to the other eye. The dual image tricks the brain into perceiving depth.

Another method of creating a stereoscopic effect which does not require special images, uses eye wear with "neutral density" filters. In this type of eye wear, the lens for one eye is darker than the lens for the other eye. The nerves of the viewer do not transmit the darker image to the brain as fast as the lighter image. This causes a time delay between when the brain receives each image. This time delay between the light and dark images, commonly called the Pulfrich Effect, creates the illusion of a single stereoscopic image.

These methods have been described in or have been the subject of various patents. For example, U.S. Pat. No. 1,182,280, to J. Kennedy, discloses an early device for creating a stereoscopic effect. The device has picture cards that are rotated on a wheel. Each of the cards has a double image, preferably with an image in red superimposed on the same in green or vice versa. Further, the device has a viewing plate with colored lenses. Green and red are said to be proven as colors for the lenses.

U.S. Pat. No. 1,498,743 to Macy discloses making a three-dimensional image with a two color, double printed stereographic picture. The preferred colors are red and green. To see the picture, the viewer looks through a pair of glasses provided with a green lens and a red lens.

U.S. Pat. No. 1,548,262 to Freedman teaches the manufacture of bi-colored eye glasses. The glasses are said to have twin lenses of transparent or translucent material which are of different colors or tints, as for instance one of blue or green and one of red or orange color. The spectacles are said to have utility mainly in viewing pictures whereby certain novel effects are attained.

A cinematographic device for creating a three dimensional image is disclosed in U.S. Pat. No. 1,745,107 to Mendoza. The device has a transparent screen with successive divisions of green and red color. The screen is moved rapidly in front of a movie projector. The viewer is said to watch the projected movie with glasses having a red lens and a green lens.

U.S. Pat. No. 4,134,644 to Marks et. al. describes a system for creating three dimensional images with a stereoscopic camera system and specially colored glasses. One eye is covered by a green filter, while the other eye is covered with a red and blue filter (magenta) filter. The filters have complementary band passes and band stops.

German Patent Document No. DT 3343-781 to Gronenborn discloses a pair of glasses for creating a three dimensional image from a normal television image. The glasses have prisms on each lens for breaking the incident light into its individual colors. The lenses themselves are color filters, one lens being red while the other lens is green.

German Patent Document No. DT 3428-038 is similar to DT 3343-781. According to Document No. DT 3428-038, however, one lens cuts off the green end of the spectrum while the other lens cuts off the red end of the spectrum.

BRIEF SUMMARY AND OBJECTS OF THE INVENTION

An object of the present invention is to create perception of a stereoscopic image from a two-dimensional image generated conventionally by, for example, a conventional television. The method of creating such image perception comprises the step of viewing the two-dimensional image through a light filtering device having a first lens formed of a particular red filter and a second lens formed of a particular green filter.

Another object of the present invention is to provide a method of enhancing three-dimensional perception of an object by viewing the object through a light filtering device having a first lens formed of a red filter and a second lens formed of a green filter, which lenses have certain particular parameters in accordance with the invention.

A further object of the present invention is to provide a light filtering device for eyes for use in the method of the invention to create a stereoscopic image or enhance perception of a viewed object, the filtering device comprising a first lens formed of a particular red filter and a second lens formed of a particular green filter fabricated to have characteristics in accordance with the present invention.

In accordance with the present invention, there is provided a light filtering device for the eyes which is capable of creating a three-dimensional appearance for a viewer of a two-dimensional image produced by a standard color television set. Preferred embodiments of the device in accordance with the invention include, for example, contact lenses or eyeglasses with filtering lenses. In these embodiments, one lens for one eye is formed of a red filter for filtering red incident light, while a second lens for the other eye comprises a green filter for filtering green incident light. Normally, the red lens filters light received by the dominant eye, while the green lens filters light received by the non-dominant eye.

A great advantage of the present invention is in its simplicity of use. Unlike the prior art, the present invention does not require special steps for creating double or shifted images to be operative. Nor does it require any additional optical elements other than its particular lenses. To perceive a stereoscopic image from a two-dimensional image, the user need only view the two-dimensional image through the light filtering device. Thus, no special transmitting equipment or projection equipment is needed. Additionally, the present invention enhances perception of an object when the object is viewed through the light filtering device.

The present invention provides a light filtering apparatus through which a person views an image to perceive the image as a stereoscopic image. The apparatus comprises a first lens for filtering incident red light, the first lens comprising a red filter which substantially attenuates incident light having frequencies from approximately 450 nm to 550 nm, and a second lens for filtering incident green light, the second lens comprising a green filter which transmits more than 53% of incident light having frequencies greater than approximately 475 nm, each of the lenses being adapted to be positioned to filter light received by a corresponding eye of a person viewing.

A method according to the present invention for creating perception by a viewer of a stereoscopic image from a conventional video image comprises the steps of placing a red filtering lens which transmits more than 45% of incident light having frequencies from approximately 600 nm to approximately 700 nm over one eye of the viewer, and a green filtering lens which transmits more than 53% of incident light having frequencies greater than approximately 475 nm over the other eye of the viewer, and viewing the conventional two-dimensional video image through said red filtering and green filtering lenses.

DETAILED DESCRIPTION OF THE PREFERRED EMBODIMENTS

Figure 1:
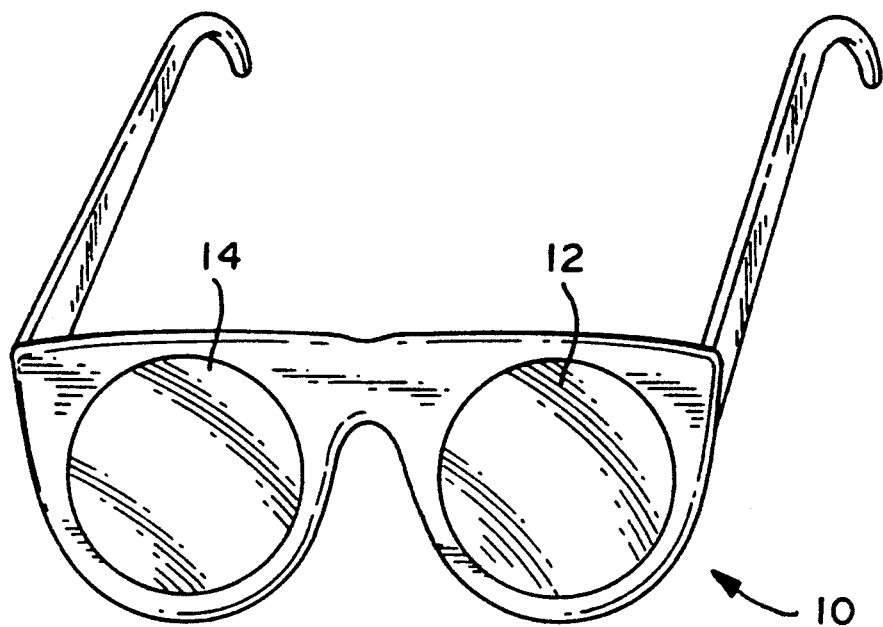
FIG. 1 is an elevated view of a first embodiment of the present invention arranged as eyeglasses.

Reference is now made to the drawings wherein like parts are designated with like numerals throughout. FIG. 1 shows an embodiment of the present invention wherein a pair of eyeglasses 10 serve as the light filtering device. The pair of eyeglasses 10 has two lenses, 12 and 14. Lens 12 is formed of a red color filter for filtering incident red light. Lens 14 comprises a green color filter for filtering incident green light.

Generally speaking, a color filter attenuates light of other colors. For example, a red filter will transmit red light, but will usually attenuate types of green, blue and violet light. Similarly, a green filter will pass green light and may attenuate types of red, orange and yellow light. The specific transmission and attenuation characteristics of a preferred embodiment of the present invention will be discussed herewith.

Figure 3:
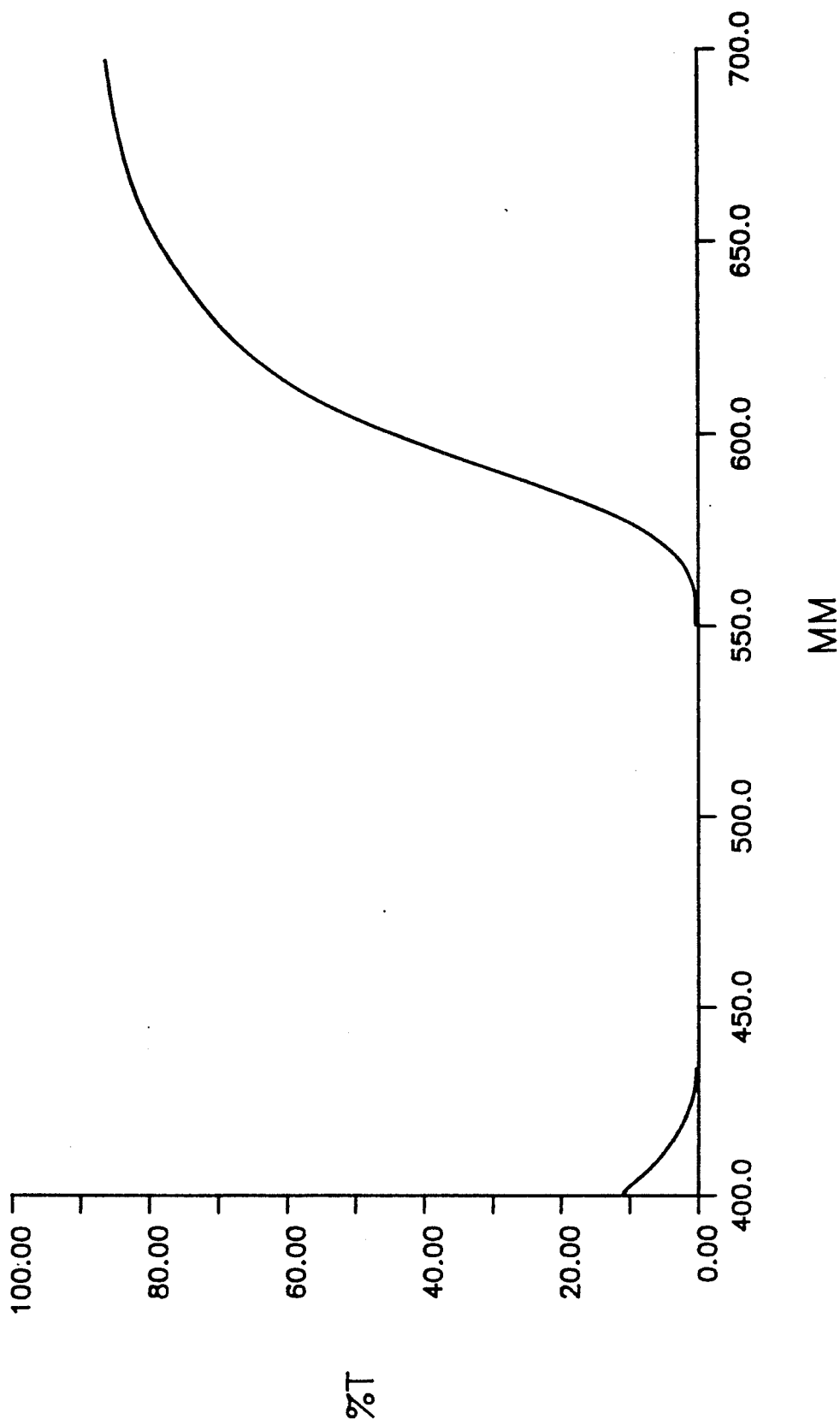
FIG. 3 is a graph showing the percentage of light transmittance versus frequency for a red lens in accordance with the present invention.

In the preferred embodiments, the red filter of lens 12 is formed so that the filter substantially attenuates incident light having frequencies from approximately 450 nm to about 550 nm. Red lens attenuation is as shown in FIG. 3. As also illustrated, the preferred red filter transmits more than 45% of the incident light having frequencies from approximately 600 nm to approximately 700 nm. In the preferred embodiments, the overall luminal transmittance of the red filter is from approximately 5% to approximately 30% More preferably, the luminal transmittancy is between approximately 20% to approximately 25%. Most preferably, the overall luminal transmittance of the red filter falls within a range of approximately 20% to approximately 22%. In use, it is contemplated that the red lens will be placed over the dominant eye of the wearer during viewing of a conventional television. Conveniently, the red lens can be made to cover the left eye.

Figure 4:
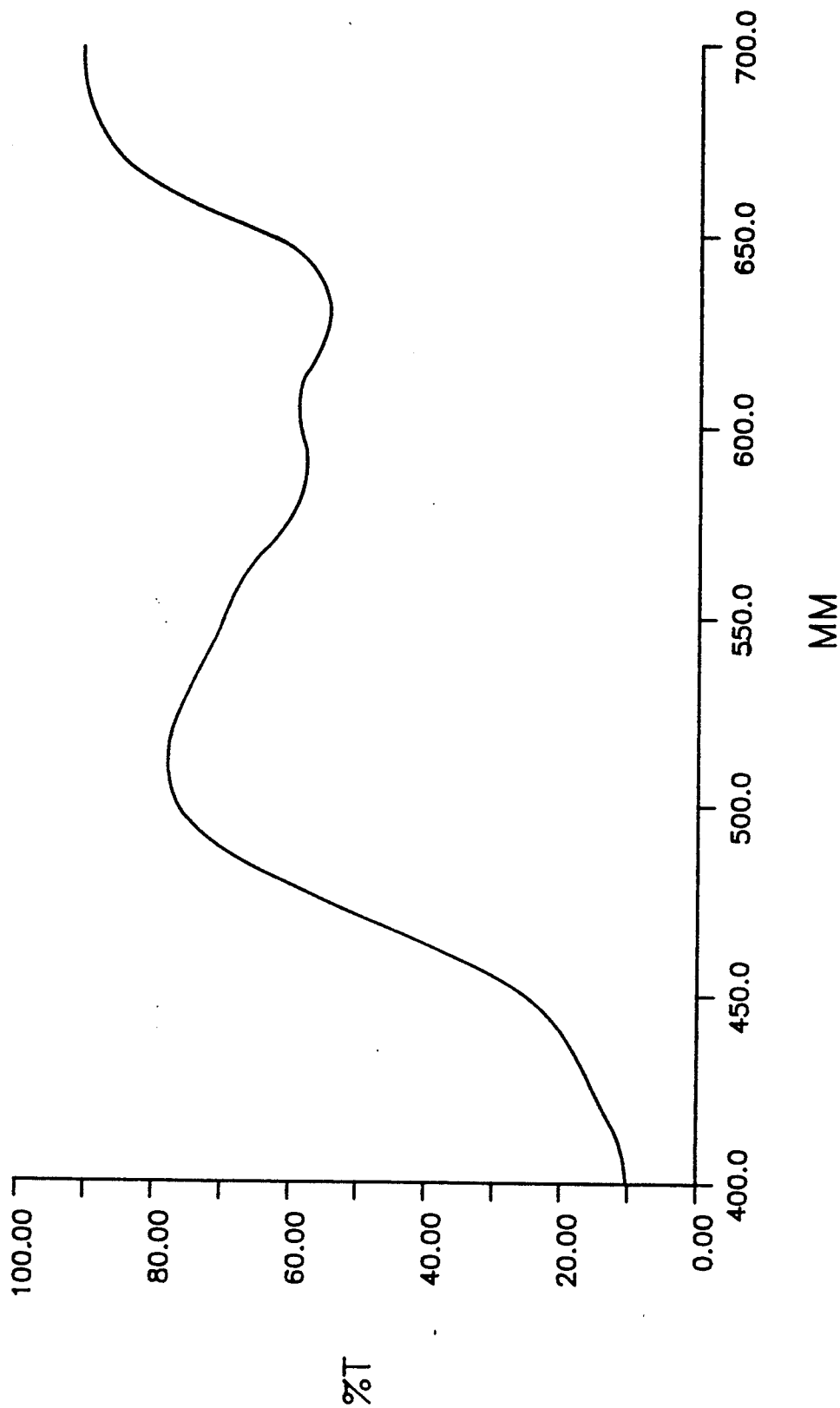
FIG. 4 is a graph showing the percentage of light transmittance versus frequency for a green lens in accordance with the present invention.

The characteristics of preferred lens 14 comprising the green filter are shown in FIG. 4. As illustrated, in the preferred embodiment the green filter transmits more than about 53% of incident light having frequencies greater than approximately 475 nm. Moreover, a preferred green filter transmits at a peak of about 75% of the incident light having a frequency of approximately 510 nm, as is also shown in FIG. 4. However, the transmittance of the green lens can vary considerably.

Between approximately 510 nm and 700 nm, the green filter has three transmission peaks: approximately 75% transmission at about 510 nm, about 58% transmission at approximately 610 nm, and about 90% transmission at approximately 700 nm. In this range, the preferred green lens also has two attenuation troughs: about a 57% transmission at approximately 585 nm and about a 53% transmission at approximately 630 nm. The overall luminal transmittance of the green filter should be within a range of approximately 58% to 60% In use, it is contemplated that the green lens is placed on the non dominant eye of the wearer during viewing. Both the green and red lenses can be made of glass or plastic in accordance with known techniques.

In use, the lenses of the present invention create a stereoscopic image for the viewer of a two-dimensional color television image or other color video image. Thus, a television viewer would simply wear the eyeglasses 10 when watching television to observe the stereoscopic effect.

The lenses having the particular filtering and transmittance characteristics in accordance with the present invention are alone sufficient to produce the desired stereoscopic effect. No other special optical components are necessary for use in conjunction with lenses 12 and 14. For instance, no prisms or the like are required. Further, viewers observe the three dimensional image as they view a standard, unaltered color television screen while wearing the eyeglasses 10. No special adjustments to the standard television are required. Also, it is contemplated that a still more pleasing three dimensional effect may be obtained by adjusting the color of the television in a conventional manner. In any case, the conventional adjustment of the television is a matter of preference and is not necessary for the creation of the three dimensional image in accordance with the present invention. Most preferably, the glasses 10 according to the invention are used when viewing a color television set.

Figure 2:
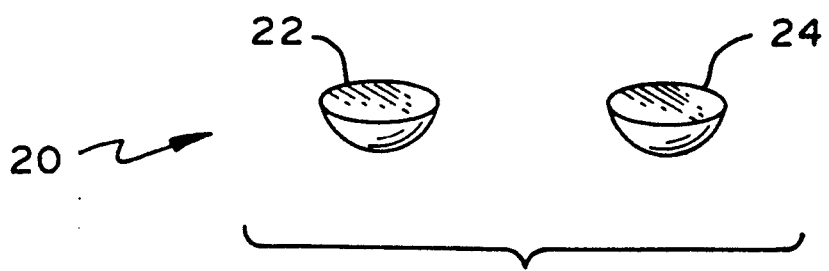
FIG. 2 is an elevated view of a second embodiment of the present invention arranged as a pair of contact lens.

FIG. 2 illustrates another embodiment of the invention wherein contact lenses 20 serve as the light filtering device. Contact lens 22 comprises a red filter, while lens 24 is a green filter. The contact lens embodiment 20 of the present invention may be used instead of the eyeglasses 10 to create a similar stereoscopic image without need for generation of special images by the television to be viewed, or additional optical elements.

It is envisioned that the present invention may be used for "remote control" surgery, where the surgeon's actions are guided by a television image, like those made by a fiber optic catheter camera. Here, the present invention could aid the surgeon in distinguishing depth, thereby facilitating the operation and ensuring safety.

Another contemplated use for the present invention is to enhance the quality of perception of objects that, for example, are different distances from the viewer. For instance, a golfer might use the contact lens embodiment 20 when golfing, to improve his perception of the relative distance of objects on the golf course. Likewise, a surgeon may use the eyeglasses 10 when operating to distinguish relative depths. Thus, as well as converting two-dimensional images to stereoscopic images, the present invention may be used to enhance the perception of three-dimensional objects.

Further variations and modifications for the foregoing will be apparent to those skilled in the art and are intended to be encompassed by the claims appended hereto.

I claim:

1. A light filtering apparatus through which a person views an image to perceive the image as a stereoscopic image, said apparatus comprising:
    a first lens for filtering incident red light, said first lens comprising a red filter which substantially attenuates incident light having frequencies from approximately 450 nm to 550 nm to less than 5% transmittance and
    a second lens for filtering incident green light, said second lens comprising a red filter which substantially attenuates incident light having frequencies from approximately 450 nm to 550 nm to less than 5% transmittance and
    a second lens for filtering incident green light, said second lens comprising a green filter which transmits more than 53% of incident light having frequencies from approximately 475 nm to approximately 700 nm,
    each of said lenses being adapted to be positioned to filter light received by a corresponding eye of a person viewing.

2. A light filtering apparatus according to claim 1, comprising eyeglasses frames for supporting said lenses in front of the eyes of a person viewing.

3. A light filtering apparatus according to claim 1, wherein said lenses are formed as contact lenses.

4. A light filtering apparatus according to claim 1, wherein said red filter transmits more than 45% of incident light having frequencies from approximately 600 nm to approximately 700 nm.

5. A light filtering apparatus according to claim 1, wherein said red filter has a luminal transmittance in a range between approximately 5% to approximately 30%.

6. A light filtering apparatus according to claim 5, wherein said range is between approximately 20% to approximately 25%.

7. A light filtering apparatus according to claim 5, wherein said range is between approximately 20% to approximately 22%.

8. A light filtering apparatus according to claim 1, wherein said green filter has a luminal transmittance in a range between approximately 58% to approximately 60%.

9. A method of creating a three dimensional image for a viewer of a two dimensional video image provided by a standard color television said method comprising the steps of:
    placing a red filtering lens which transmits more than 45% of incident light having frequencies from approximately 600 nm to approximately 700 nm over one eye of the viewer, and a green filtering lens which transmits more than 53% of incident light having frequencies greater than approximately 475 nm over the other eye of the viewer, and
    viewing the two-dimensional video image through said red filtering and green filtering lenses to thereby create a perception of a stereoscopic image in a viewer when viewing a two dimensional video image.

10. A method of creating a three dimensional image for a viewer of a two dimensional video image provided by a standard color television in accordance with claim 9 wherein said red filtering lens is disposed over a dominant eye of the viewer and said green filtering lens is placed over the viewer's non-dominant eye.

11. A method of creating a three dimensional image for a viewer of a two dimensional video image provided by a standard color television in accordance with claim 9 wherein incident light having frequencies from approximately 450 nm to 550 nm is substantially attenuated to less than 5% transmittance by said red filtering lens.

12. A method of creating a three dimensional image for a viewer of a two dimensional video image provided by a standard color television in accordance with claim 9 wherein said red filtering lens has a luminal transmittance between approximately 5% to approximately 30%.

13. A method of creating a three dimensional image for a viewer of a two dimensional video image provided by a standard color television in accordance with claim 9 wherein said red filtering lens has a luminal transmittance between approximately 20% to approximately 25%.

14. A method of creating a three dimensional image for a viewer of a two dimensional video image provided by a standard color television in accordance with claim 9 wherein said red filtering lens has a luminal transmittance between approximately 20% to approximately 22%.

15. A method of creating a three dimensional image for a viewer of a two dimensional video image provided by a standard color television in accordance with claim 9 wherein approximately 75% of incident light having a frequency of approximately 510 nm is transmitted through said green lens.

16. A method of creating a three dimensional image for a viewer of a two dimensional video image provided by a standard color television in accordance with claim 9 wherein said green lens has a luminal transmittance between approximately 58% to approximately 60%.

17. A method of enhancing perception for a viewer of an object, said method comprising the steps of:
    placing a red filtering lens which transmits more than 45% of incident light having frequencies from approximately 600 nm to approximately 700 nm and which substantially attenuates incident light having frequencies from approximately 450 nm to 550 nm to less than 5% transmittance over one eye of the viewer, and a green filtering lens which transmits more than 53% of incident light having frequencies from approximately 475 nm to approximately 700 nm over the other eye of the viewer, and
    viewing the object through said red and green filtering lenses.

* * * * *